(12) United States Patent
Kocur et al.

(10) Patent No.: US 10,913,466 B2
(45) Date of Patent: Feb. 9, 2021

(54) ADAPTIVE RAIL INSPECTION CARRIAGE

(71) Applicant: Sperry Rail, Inc., Danbury, CT (US)

(72) Inventors: Jan Kocur, Shelton, CT (US); Daniel Morehouse, Newtown, CT (US)

(73) Assignee: Sperry Rail, Inc., Shelton, CT (US)

( * ) Notice: Subject to any disclaimer, the term of this patent is extended or adjusted under 35 U.S.C. 154(b) by 263 days.

(21) Appl. No.: 16/070,437

(22) PCT Filed: Jan. 13, 2017

(86) PCT No.: PCT/US2017/013350
§ 371 (c)(1),
(2) Date: Jul. 16, 2018

(87) PCT Pub. No.: WO2017/123879
PCT Pub. Date: Jul. 20, 2017

(65) Prior Publication Data
US 2019/0023286 A1 Jan. 24, 2019

Related U.S. Application Data

(60) Provisional application No. 62/279,312, filed on Jan. 15, 2016.

(51) Int. Cl.
*B61D 15/12* (2006.01)
*B61K 9/10* (2006.01)
*G01N 29/265* (2006.01)

(52) U.S. Cl.
CPC .............. *B61D 15/12* (2013.01); *B61K 9/10* (2013.01); *G01N 29/265* (2013.01); *G01N 2291/2623* (2013.01)

(58) Field of Classification Search
CPC ........ B61D 15/00; B61D 15/08; B61D 15/12; E01B 35/00; E01B 35/02; E01B 35/04; E01B 35/06; E01B 35/12
See application file for complete search history.

(56) References Cited

U.S. PATENT DOCUMENTS

| 1,241,105 A | 9/1917 | Frindt |
| 4,468,966 A | 9/1984 | Bradshaw |

(Continued)

FOREIGN PATENT DOCUMENTS

| GB | 1466087 | * 3/1977 | ................ B16F 5/52 |
| GB | 1466087 A | 3/1977 | |

OTHER PUBLICATIONS

International Search Report for Application No. PCT/US2017/013350 dated May 26, 2017.

*Primary Examiner* — Robert J McCarry, Jr.
(74) *Attorney, Agent, or Firm* — McCormick, Paulding & Huber PLLC

(57) ABSTRACT

An adaptive inspection carriage for inspecting the rails of a railroad by one or more detectors supported by the carriage. The carriage includes a frame having a generally rectangular configuration with oppositely disposed side members and transverse members. The side members may be in an operative position extending parallel to a respective rail to be inspected. The transverse members may be in an operative position extending in a direction transverse to the rails. Each transverse member may be connected at one end with a side member by means of a swivel coupling having one swivel axis perpendicular to the plane of the generally rectangular frame and another swivel axis parallel to the side member, and connected at the other end to another side member by a swivel coupling having one swivel axis perpendicular to the plane of the rectangular frame and no swivel axis parallel to the second side member.

27 Claims, 8 Drawing Sheets

(56) References Cited

U.S. PATENT DOCUMENTS

| | | | |
|---|---|---|---|
| 6,476,603 B2 * | 11/2002 | Clark | B61D 15/00 |
| | | | 324/217 |
| 6,600,999 B2 | 7/2003 | Clark et al. | |
| 7,389,694 B1 | 6/2008 | Hay et al. | |
| 2014/0069193 A1 * | 3/2014 | Graham | G01N 29/04 |
| | | | 73/584 |

* cited by examiner

ADAPTIVE RAIL INSPECTION CARRIAGE

CROSS-REFERENCE TO RELATED APPLICATIONS

This application is a National Stage application of International Patent Application No. PCT/US2017/013350, filed on Jan. 13, 2017, which claims priority to U.S. Provisional Patent Application 62/279,312 filed Jan. 15, 2016, each of which is hereby incorporated by reference in its entirety.

TECHNICAL FIELD

The present invention relates to the field of inspection equipment for the rails of a railroad track, and in particular, to the inspection carriages which support inspection instruments and travel along the rails during an inspection process. Such carriages generally are suspended under a rail car or a hi-rail vehicle that is adapted with wheels to travel along the rails, or the carriage may be lowered onto the rails from a hi-rail vehicle that tows the carriage along the rails during an inspection operation. The instruments or probes suspended from the carriage and performing the inspection operations are of various types and may include ultrasonic, electromagnetic, electrostatic, inductive, and optical instruments and cameras that are intended to examine the rails for faults, defects, and structural failures internally and externally of the rails. The data from the instruments is recorded live as it is captured during an inspection operation, and is recorded in the tow vehicle or sent electronically to a data center for analysis and reporting to the railroad administrators. An inspection carriage of this general type is disclosed in U.S. Pat. No. 6,600,999 assigned to the assignee of the present application.

BACKGROUND

The process of inspecting the rails of a railroad is ideally carried out with the inspection probes positioned in a standard position, which may be a centered position, over a railhead. Since both rails of a track are generally inspected at the same time, the inspection probes are suspended from both sides of an inspection carriage that has a generally rectangular frame. However, the ideal positioning of the probes is difficult to achieve due to variations in the track geometry that arise from a number of factors: the heavy loads borne by the rails, settling of the track bed, and shifting ground occurring over extended periods of time.

As a consequence of the various factors, the rails of a railroad track while ideally parallel are not always parallel. For example, the gauge or spacing of the rails of a standard gauge railroad is ideally 56.5 inches, but can vary as much as 1.5 inches before re-construction is necessary to avoid derailments. Additionally the rails at each side of the track are not locked together, and therefore, the rails can vary in height from one side of the track to the other. The variations in height from one side to the other due to bed settlement and frost heaves may be in the order of several inches. Since it is the function of the inspection carriage to position the inspection probes on both sides of the carriage in a fixed relationship with respect to the rail heads, the variations in track geometry present significant challenges. The adaptive inspection carriage described and claimed herein is intended to compensate and overcome the challenges presented by the variations in track geometry and to position the inspection probes as near as possible over the rail heads.

Other problems associated with the rails and their construction also can interfere with the ideal positioning of the inspection probes with respect to the railhead. For example, the joints between rails may sometimes open up as a result of temperature variations or rail movement under load.

Additionally, in track layouts multiple tracks may cross, merge, and separate. The rail cars have flanged wheels to stay on the rail heads, so there must inevitably be gaps in the rail head at "frogs" or crossovers to allow the wheel flanges to pass through one rail to another. Check rails are frequently positioned adjacent the gauge side of the rail opposite the rail with a gap to prevent flanged wheels of rail cars from jumping through the gap. The check rails capture the flange of the opposite wheel between the check rail and the opposite running rail, and with a fixed length axle hold the flanged wheel passing by the gap away from the gap.

When an inspection carriage, such as shown in U.S. Pat. No. 6,600,999, having an adjustable gauging axle to accommodate variations in track gauge reaches a gap in a rail head at a crossover, pressure pushing the carriage wheels outwardly toward the gauge face of the rails must be released and the carriage wheels may be drawn inward away from the gauge faces and the gap. As a consequence the prior art inspection carriages have had lockout modes of disabling the forced outward pressure on the carriage wheels at the gaps. The lockout modes had to be manually activated by the watchful carriage operator in conjunction with a severe reduction in transit/test speed. The manual activation is a serious inconvenience for the operator and can result in lost test data during the lockout period. Ideally it is desirable to have the lockout mode accommodated by other means.

SUMMARY

An adaptive inspection carriage for inspecting the rails of a railroad by means of one or more sensors supported by the carriage has a frame having a generally rectangular configuration with oppositely disposed first and second side members and first and second transverse members. Each of the side members in an operative position extends generally parallel to a respective rail to be inspected, and each of the transverse members in an operative position extends in a direction generally transverse to the rails.

The first transverse member is connected at one end with the first side member by means of a swivel coupling having one swivel axis generally perpendicular to the plane of the generally rectangular frame, and another swivel axis generally parallel to the first side member. The first transverse member is connected at the other end to the second side member by means of a swivel coupling having one swivel axis generally perpendicular to the plane of the generally rectangular frame and no swivel axis parallel to the second side member.

The second transverse member is connected at one end with the second side member by means of a swivel coupling having one swivel axis generally perpendicular to the plane of the generally rectangular frame and another swivel axis generally parallel to the second side member. The second transverse member is connected at the other end to the first side member by means of a swivel coupling having a swivel axis having one swivel axis generally perpendicular to the plane of the generally rectangular frame and no swivel axis parallel to the first side member.

With the generally rectangular frame constructed as described the frame is free to flex out of the plane of the frame and accommodate deviations in the rail height from one corner of the frame to the other. The frame flexing enables the supported sensors to maintain a generally fixed positional relationship with the rail heads during an inspection operation, and provide more consistent readings of the rail conditions regardless of the deviations of the rail heights.

Each of the first and second transverse members can be an adjustable gauging member having an adjustable length between the connections with the side members, and each gauging member can include an actuator for adjusting the length of the member according variations in the gauge dimension of the rails. In this manner variations in the actual gauge dimension of the rails can be accommodated and again support the sensors on the carriage in a generally fixed positional relationship with the rail heads during an inspection operation regardless of variations in the gauge dimensions.

The inspection carriage with transverse members that are adjustable for variations in the gauge dimensions of the rails may also have a carriage wheels connected with the transverse members at each lateral side of the frame to support the carriage for rolling movement along the rails of the railroad. A pair of gauge face follower wheels are positioned fore and aft of each carriage wheel and cooperate to bridge the gaps in the railheads at crossovers and other breaks in the railheads. Check rail plows are advantageously positioned between the pairs of gauge face wheels to also serve the function of blocking the opposite pair of gauge face follower wheels from falling into gaps in the rail heads and preventing the gauge face follower wheels from colliding with or riding up on the "point" in a facing frog.

BRIEF DESCRIPTION OF THE DRAWINGS

FIG. 7 is a gauge side view showing the support of FIG. 6 for a carriage wheel and a pair of gauge face follower wheels with a check-rail plow in between.

DESCRIPTION OF THE PREFERRED EMBODIMENTS

Figure 1:
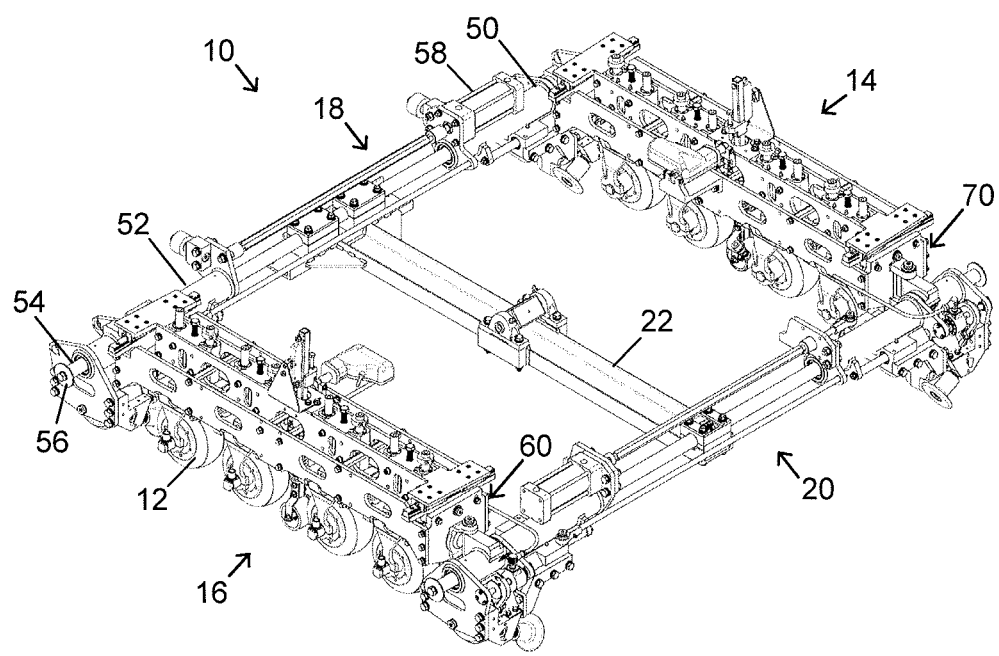
FIG. 1 is a perspective view of an adaptive inspection carriage of the present application in one preferred embodiment.

FIG. 1 shows one embodiment of an adaptive inspection carriage 10 for inspecting the rails of a railroad track by means of one or more sensors or probes suspended from the carriage. The sensors are of various well known types and may include ultrasonic, electromagnetic, electrostatic, inductive, and optical instruments and cameras. Illustrated in FIG. 1 are a series of roller search units (RSU's) 12 that employ ultrasonic transducers inside fluid filled tires to detect internal defects in the rails. An example of the RSU of one type is shown and described in detail in U.S. Pat. No. 8,739,631 issued to Havira et al. The sensors play no part in the present invention, other than the fact that they set the parameters by which the adaptive carriage supports the sensors for reliable detection of rail faults or defects, most importantly, the positioning of the sensors relative to the rails and holding the sensors in position under varying rail conditions. Accordingly the sensors are not shown or described in any further detail.

The carriage 10 has a generally rectangular frame comprised by oppositely disposed side frame members 14 and 16, and front and rear transverse members 18 and 20 respectively. The carriage is either suspended by the side frame members 14, 16 under a hi-rail vehicle that is adapted to travel on the rails under its own power, or can be towed behind a hi-rail vehicle. In the present case the carriage is provided with a central frame member 22 extending between the front and rear transverse members for lifting and lowering the carriage and towing the carriage in its lowered operative position on the rails behind a hi-rail vehicle. The central frame member 22 is connected in perpendicular relationship with the front transverse member 18, and has a floating connection with the rear transverse member 20 that allows limited angular and lateral movement relative to the rear transverse member so that the generally rectangular carriage frame can deviate from a pure rectangle and align the side members 14, 16 with rails that are skewed or not precisely parallel as discussed further below.

Figure 2:
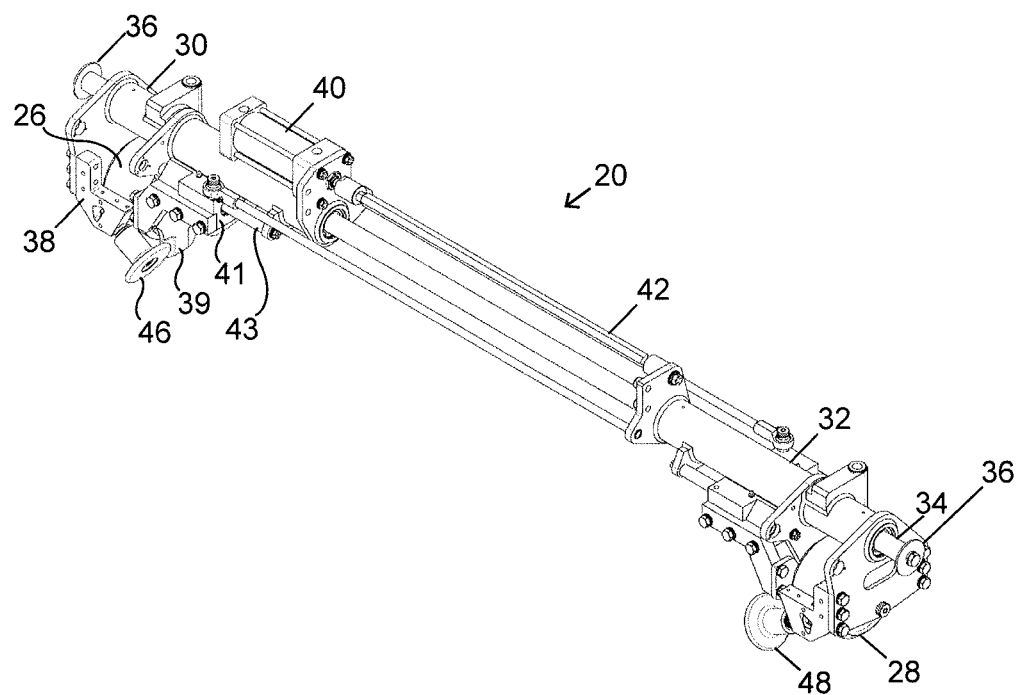
FIG. 2 is a perspective view of an adjustable transverse frame member with bushings at each end and associated carriage wheels supported by the bushings.
Figure 6:
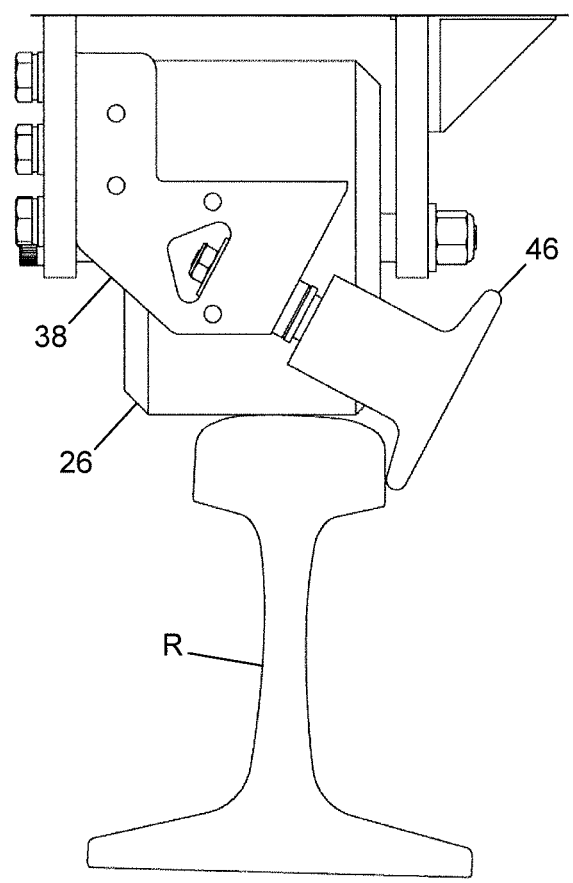
FIG. 6 is end view showing the support for a carriage wheel and gauge face follower wheel on a track rail.

FIG. 2 shows the rear transverse member 20 isolated from the rest of the carriage. The front transverse member 18 is similarly constructed. Two of the carriage wheels 26, 28 are mounted at opposite ends of the rear transverse member 20 and support the rear of the carriage on the railheads of the track, as shown in FIG. 6, when the carriage is lowered in an operative position for performing inspection operations. A similar set of carriage wheels (not clearly visible in FIG. 1) are mounted at the ends of the front transverse frame member 18, and support the front of the carriage in an inspection operation. If desired, the carriage wheels could alternatively be mounted at fore and aft positions on the side frame members. The wheels shown are flangeless wheels to accommodate some variations in the gauge dimension of the rails without difficulty, but could be flanged wheels if desired.

To further accommodate variations in the gauge dimensions of the track, the front and rear transverse members 18, 20 are adjustable gauging members having adjustable lengths between their connections with the side frame members. As shown in FIGS. 1 and 2, the rear transverse member 20 has a slide weldment or bushing 30 at one end to connect with the side frame member 16, and a bushing 32 at the opposite end to connect with the side frame member 14. The bushings are mounted on a fixed length rod 34 with end caps 36 by means of internal linear roller bearings (not visible) so that the distance between the bushings on the rod is adjustable for variations in the gauge dimensions of the rails. The carriage wheel 26 is mounted to the bushing 30, and the carriage wheel 28 is mounted to the bushing 32. Therefore the positioning of the bushings sets the positioning of the carriage wheels relative to the railheads.

An electric, pneumatic or hydraulic actuator 40 is connected to the bushing 30 and has an actuating rod 42 connected to the bushing 32. The actuator 40 is controlled during an inspection operation to extend and apply pressure to the bushings and pairs of gauge-face follower wheels 46, 48, which in turn keeps the carriage wheels 26, 28 on the rail heads regardless of the variations in the gauge dimension. See FIG. 6. The maintenance of the position of the carriage wheels over the railheads correspondingly maintains the optimal inspection positions of the sensors over the railheads. In the event the carriage passes over a crossover, switch, or other interruption in the railhead, the actuator can be deactivated by the inspection equipment operator to eliminate the pressure on the carriage wheels that could cause the carriage to jump the track.

Figure 7:
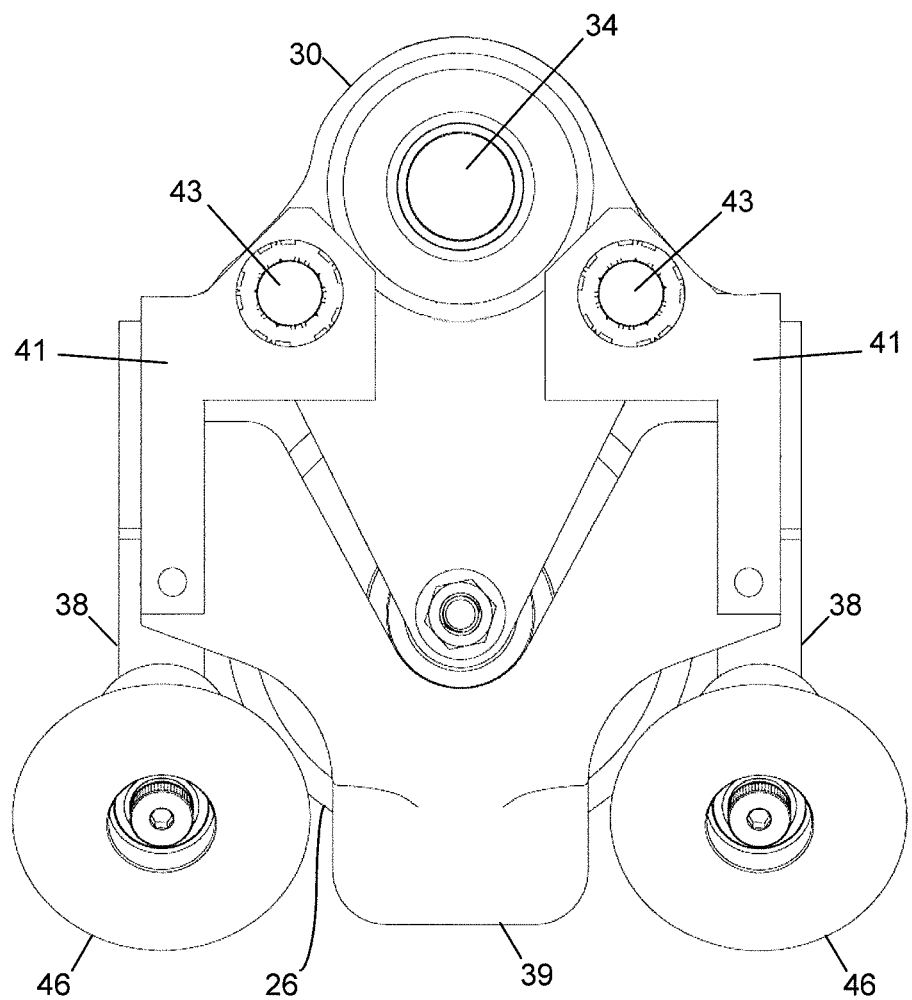

FIGS. 2, 6 and 7 illustrate the mounting and positioning of the gauge-face follower wheels 46 relative to the carriage wheels 26. A wheel frame 38 supports both the carriage wheel 26 and the gauge-face follower wheels 46 from the bushing 30. The carriage wheels 26 have no flanges as a conventional railcar wheel would have. The wheel width gives the carriage wheel latitude to track rail heads with little concern for variations in gauge dimension. The gauge-face follower wheels are a useful complement to the flangeless carriage wheels and effectively serve the function of the flanges.

The greater width of these wheels over that of prior art gives the carriage wheel latitude to land repeatedly on the top of the rail when the adjustable transverse frame members are retracted and the carriage is being lowered into the test position. The greater width of these wheels also allows them to temporarily run on the alternate rail in a turnout where the running rail is intentionally missing. The specific extent of these wheels laterally across the rail relative to the gauge face of the head of the rail is designed to match that of normal rolling stock, which allows these wheels and this carriage to make use of guard geometry in self-guarding frogs (a type of rail feature used in low-speed areas such as rail yards).

As shown in FIG. 7, the gauge face follower wheels are mounted in pairs from the wheel frame 38 at positions fore and aft of the carriage wheel 26 in the travel direction of the wheel. The fore and aft positioning ensures that the carriage 10 will not jump the track or be derailed when the carriage passes over complex track geometry, such as a break in the railhead at a crossover or frog of a switch. Generally the spacing of the follower wheels 46 is large enough to ensure that one or the other of the follower wheels will be in contact with the gauge face of the railhead at one side or the other of the break.

The gauge face follower wheels 46 are preferably mounted as shown in FIG. 6 with their axes of rotation at an angle in the range of 30° to 50° to the axis of rotation of the carriage wheel. The angular mounting is selected to keep the wheels out of the way of weeds and debris that may lie near gauge face of the rail R, but also ensures that that outer periphery of the wheel is the contact point with the gauge face of the railhead.

The size, shape and inclination of the gauge face follower wheels 46 also allow them to clear raised check rails and crossings while maintaining contact with the part of the rail that is less likely to be worn, the lower section of the rail head, which is also an ideal place for gauge measurement via, for example, a linear string potentiometer. The gauge face follower wheels 46 do this without forcing the carriage to be overly long and without interfering with the check rail safety feature of the carriage.

Figure 3:
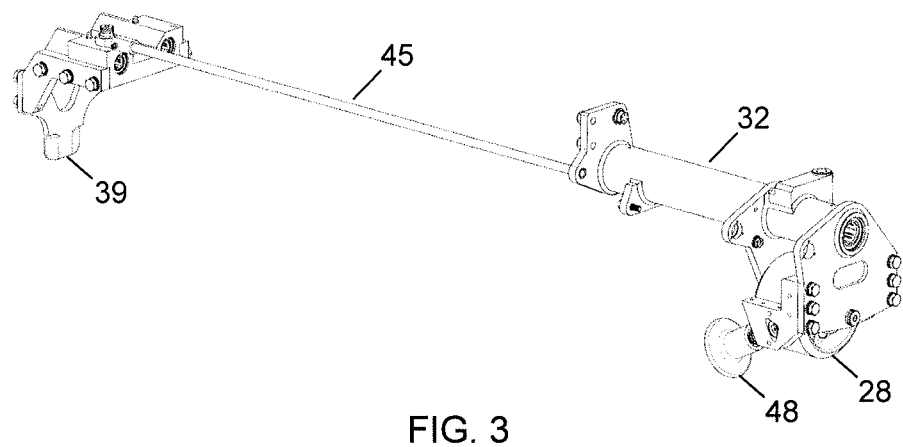
FIG. 3 is a perspective view of a fixed length portion of the adjustable transverse frame member of FIG. 2.

Additional protection against derailment of the carriage is provided by check-rail plows 39 shown in FIGS. 2, 3, and 7. A second rail or check rail is often provided adjacent the rail opposite a rail with complex geometry that requires an interruption in the railhead and where a derailment is likely. The check rail lies in close relationship and parallel to the running rail without the interrupted railhead, and engages the flange of the wheels of a conventional rail car to limit lateral movement and keep both rail car wheels on the running rails. The check-rail plows 39 on the inspection carriage 10 with flangeless wheels 26, 28 serve the safety function of the wheel flanges of a conventional rail car.

The check-rail plow 39 shown in FIGS. 2, 3 and 7 is mounted on a slide 41 supported on slide rods 43 fixed to the bushing 30. The slide 41 is provided because the transverse frame member 20 is adjustable in length and the actuator urges the bushings 30, 32 and wheels 26, 28 outwardly toward into contact with the railheads of the rails. Since the plow 39 is for the purpose of holding the carriage wheel 28 on the rail underlying the opposite bushing 32 when the railhead under the bushing 32 is interrupted, the wheel 28 and the check-rail plow 39 are joined by a fixed length connection including the slide 41, the tie rod 45, and the bushing 32, which effectively override the actuator when a check rail is employed and the wheel 28 passes over the interruption in the railhead. The fixed length connection between the plow 39 and the carriage wheel 28 mounted to the bushing 32 opposite the bushing 30 on which the plow is supported is more easily seen in the isolated view of FIG. 3. In this manner the plow 39 performs the same function as flanges would on the wheel 26. Similar connections are made between the other plows and the opposing bushings to perform the same function of retaining the flangeless carriage wheels on the rails. The arrangement of the plows 39 between the gauge face followers 46 allows the plows 39 to operate without interfering with the carriage wheel 28 or the gauge face followers 46 and their associated mounting structures, minimizing the space envelope of the carriage and allowing a gauging axle that otherwise would require manual protection (gauge locking) to keep itself guarded through turnouts.

The front transverse frame member 18 as shown in FIG. 1 is also an adjustable gauging member, and is constructed in the same fashion as the rear transverse frame member. The front member has bushings 50, 52 at each end connected with the side frame members 14, 16 respectively and a fixed length rod 54 with end caps 56 on which the bushings are mounted so that the distance between the bushings is adjustable for variations in the gauge dimension of the rails. A carriage wheel (not visible) is mounted in each bushing to support the front of the carriage 10 on the rails. An electric, pneumatic or hydraulic actuator 58 connected with the bushings to urge the bushings and wheels with gauge-face follower wheels outwardly against the rails regardless of the variations in the gauge dimension. The maintenance of the position of the carriage wheels over the railheads correspondingly maintains the optimal inspection positions of the sensors over the railheads.

It will be understood that with the front and rear transverse members being independently adjustable in length to keep the carriage wheels and side frame members 14, 16 in overlying relationship with the rails regardless of the variations in the gauge dimension, the generally rectangular frame of the carriage will be distorted from a true rectangle as a function of the gauge dimensions at the front and rear of the carriage. For example, if the rails deviate slightly from a fixed gauge dimension and are no longer parallel, the side frame members similarly will deviate from a parallel relationship with one another and the carriage frame will assume the shape of a trapezoid rather than a pure rectangle. As a consequence, the bushings 30, 32 50, 52 of the transverse members 20 and 18 are connected at each corner of the carriage frame with the side frame members 14,16 by means of swivel couplings that pivot about axes perpendicular to the plane of the rectangular frame 10. However, the swivel couplings at each end of the transverse members are not the same.

Figure 4:
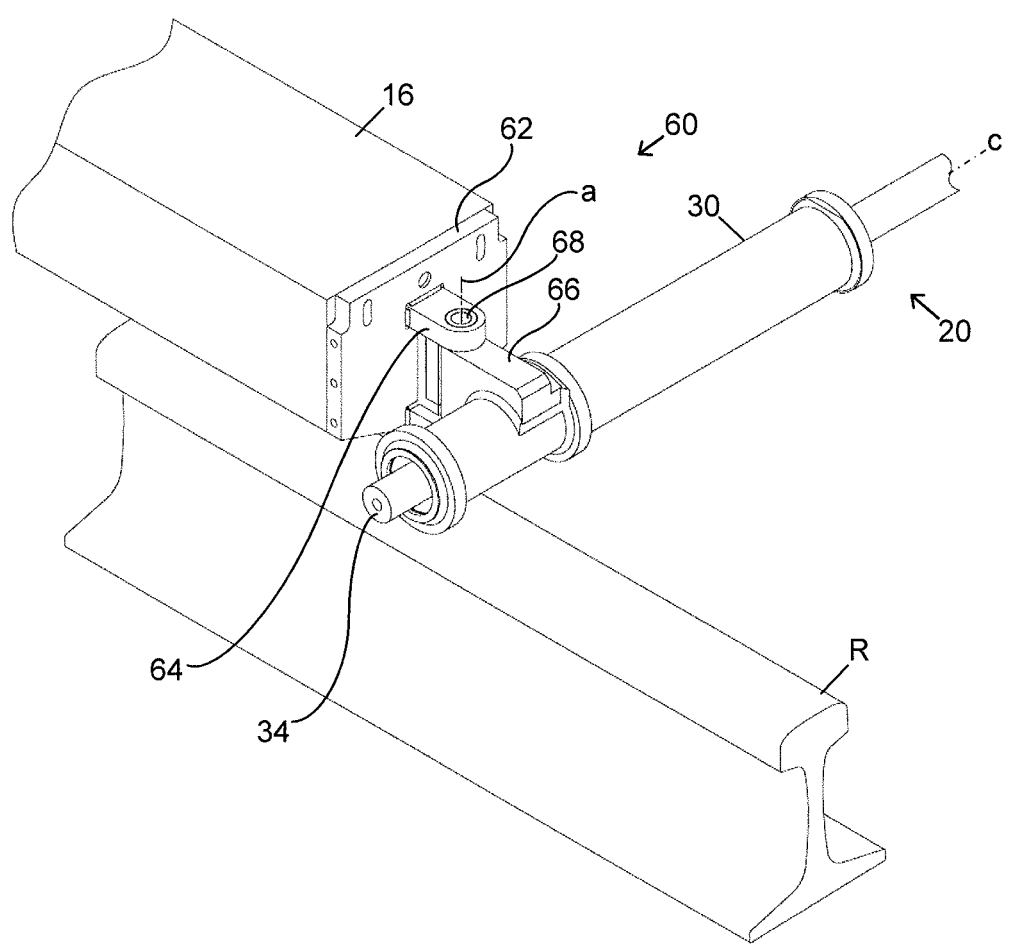
FIG. 4 is a simplified perspective view of a swivel coupling between an adjustable transverse frame member and a side frame member at one end of the adjustable frame member.

FIG. 4 illustrates the swivel coupling 60 connecting the transverse member 20 having a central axis c with the side frame member 16. The coupling is comprised of a backing plate 62 having a set of fixed lugs 64 and a hinge plate 66 that is pivotally connected with the lugs by a hinge pin 68 to permit swiveling movement of the plate about a vertical axis a relative to the side frame member 16. The hinge plate 66 is fixedly secured to the bushing 30 of the transverse member 20 by welding or other means. With the swivel coupling 60 having a single pivot axis a, the side frame member 16 and transverse member 20 can swivel relative to one another in the typically horizontal plane of the frame 10, but not about an axis parallel to the rail R. Hence the single axis coupling 60 will accommodate frame distortions due to deviations in gauge dimension, but at the same time will hold the side frame member 16 in a generally upright position.

Figure 5:
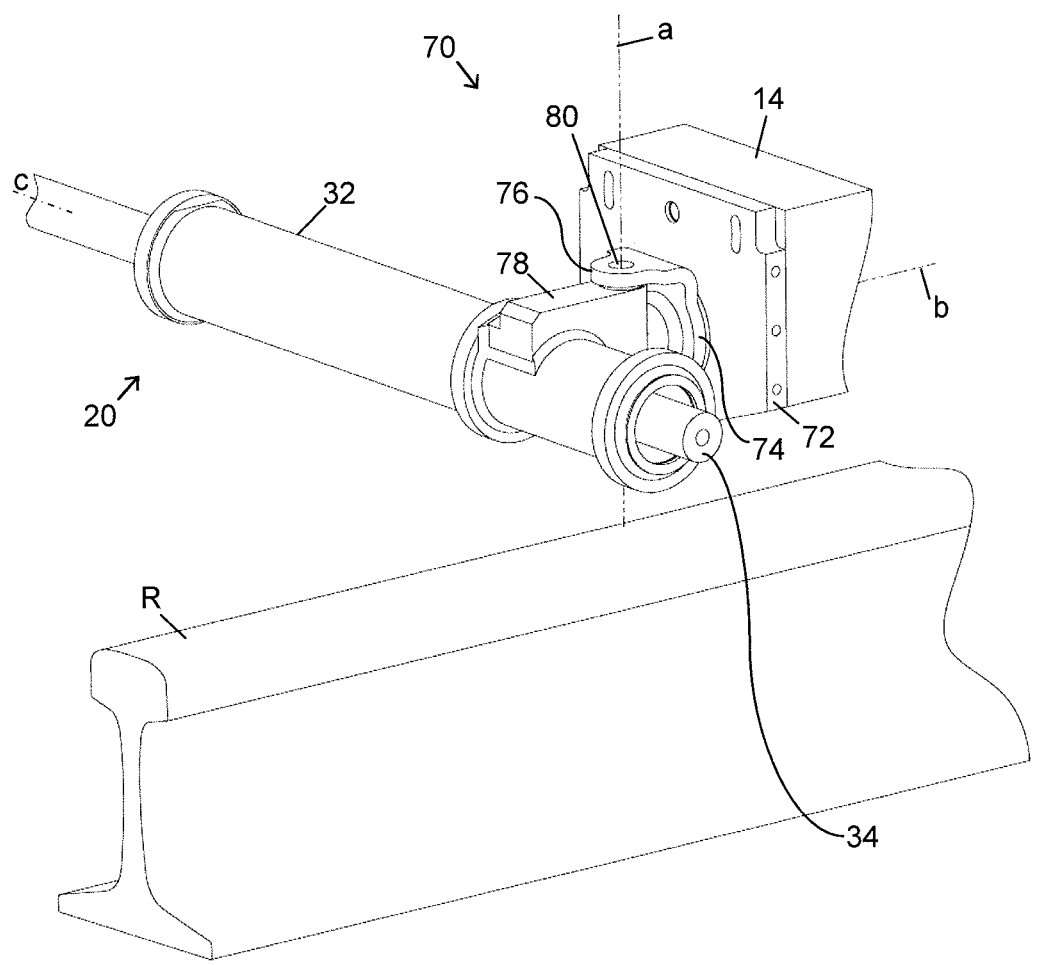
FIG. 5 is a simplified perspective view of a swivel coupling between the adjustable transverse frame member of FIG. 4 and the side frame member opposite the side frame member in FIG. 4.

FIG. 5 illustrates the swivel coupling 70 connecting the transverse member 20 with the side frame member 14. The coupling 70 is comprised of a backing plate 72, a pivotal yoke 74 with a set of lugs 76, and a hinge plate 78 that is connected with the lugs by a hinge pin 80 to permit pivoting movement of the plate about a generally vertical axis a relative to the side frame member 14. The hinge plate 78 is fixedly secured to the bushing 32 of the transverse member 20 by welding or other means. With the swivel coupling 70 having a pivot axis a, the side frame member 14 and transverse member 20 can pivot relative to one another in the typically horizontal plane of the frame 10 in the same manner as permitted by the swivel coupling 60 between the transverse member 20 and the side frame member 16. The pivotal movements of the couplings 60 and 70 about the vertical axes a accommodate variations in the gauge dimensions of the track, and allow the inspection probes to remain positioned directly over the rail heads.

Additionally, however, the swivel coupling 70 permits swiveling motion provided by the yoke 74. The yoke 74 is retained in the backing plate 72 by a large nut or clamp (not shown) that permits pivotal motion of the yoke and coupling 70 relative to the side frame member 14 about a second pivot axis b extending generally parallel to the side frame member 14 and the underlying rail R.

The swiveling motion about pivot axis b by the coupling 70 permits the carriage frame 10 to accommodate changes in elevation of the rail head between one diagonal corner of the carriage and another. To fully accommodate the changes in the height from one diagonal corner of the carriage to the other, another swivel coupling (not visible) similar to the coupling 70 with two pivot axes, is used to join the front transverse member 18 with the side frame member 16 at the diagonal corner. A single-axis coupling, such as the swivel coupling 60, is used to join the front transverse member 18 to the side frame member 14 to hold the side frame member in the generally upright position. Accordingly, two-axis swivel couplings connect the transverse members with the side frame members at diagonal corners of the frame 10, and single-axis swivel couplings connect the transverse members with side frame members at the other diagonal corners of the frame. With such coupling arrangements the carriage frame can freely accommodate and adapt to variations in the gauge dimension of the rails as well as variations in the height of the railheads from one rail R to the other.

It will be understood that with the side members 14 and 16 and transverse members 18 and 20 connected to one another with swivel couplings, each permitting pivotal motion about a vertical axis a extending perpendicular to the plane of the carriage frame, the rectangular configuration of the frame can deviate from a perfect rectangle and assume various trapezoidal shapes. Some deviation is necessary to accommodate the variations in the rail gauge dimension and allow the sensors or probes 12 to remain in overlying relationship with the rails. If the deviations were not limited, the one side member and probes could move ahead of the opposite side member and its probes. Consequently, deviations of the carriage frame 10 from the rectangular configuration are needed but must also be limited. For these purposes, the central frame member 22 is designed as a configuration restraint.

Figure 8:
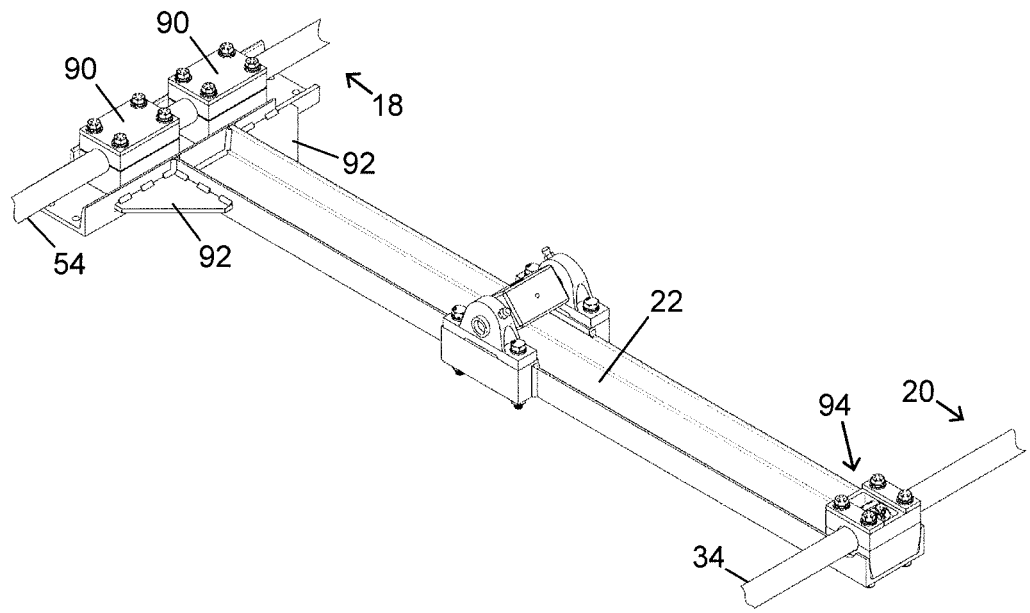
FIG. 8 is a perspective view of the central frame member of the carriage.

As shown in FIGS. 1 and 8, the central frame member 22 is a T-bar with one end fixedly connected with the front transverse member 18 by means of two clamps 90 and bracket plates 92 fastened to the rod 54. The clamps secure T-bar to the transverse member 18 at its midpoint and in conjunction with the bracket plates hold the T-bar in perpendicular relationship with the transverse member.

The opposite end of the central frame member 22 has a floating connection 94 with the rod 34 of the rear transverse member 20. The floating connection allows the T-bar to move relative to the frame member 20 with limited movements both angular and linear. The limited movements accommodate the deviations of the generally rectangular frame of the carriage 10 as the carriage rolls along the rails R with varying gauge dimensions and rising and falling heights of the railheads. In spite of the floating connection with the transverse member 20, the central frame member can also be used as the lifting point for the carriage 10.

Figure 9:
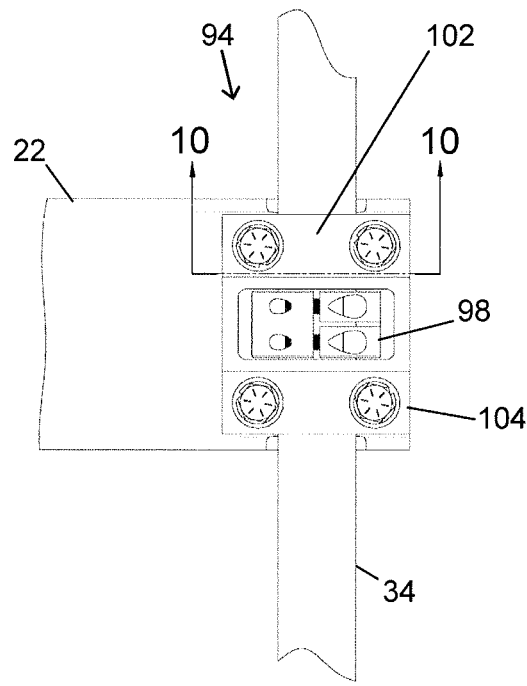
FIG. 9 is a plan view of the floating connection of the central frame member and the rear frame member.
Figure 10:
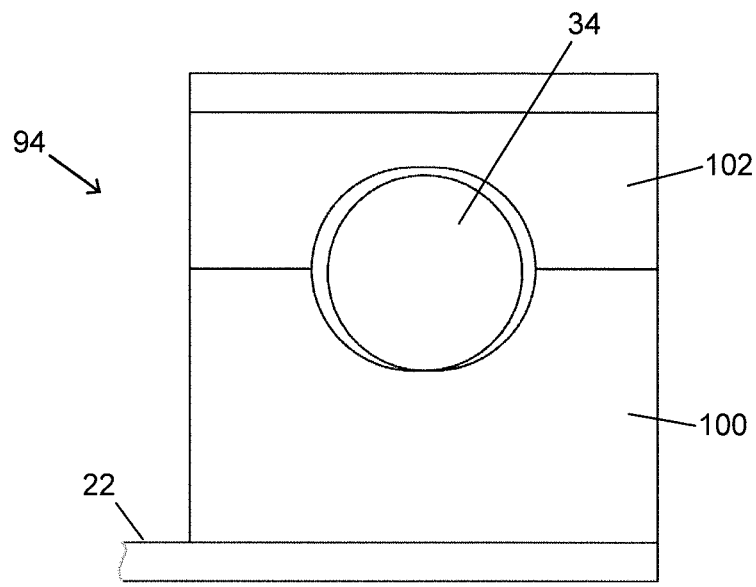
FIG. 10 is a cross sectional view of the floating connection as viewed at the section plane 10-10 in FIG. 9.
Figure 11:
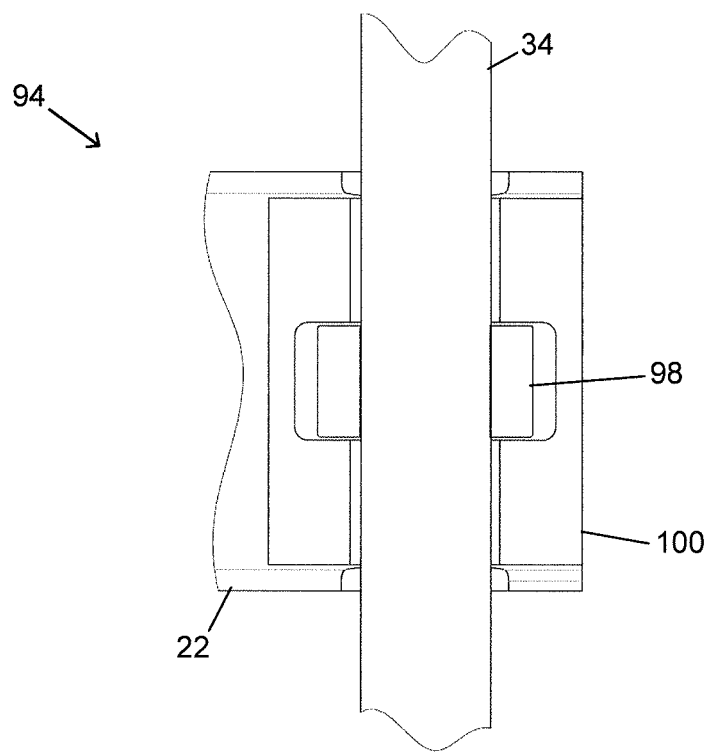
FIG. 11 is a plan view of the floating connection of FIG. 9 in cross section.

As shown in FIGS. 9, 10, and 11, the floating connection 94 of the central frame member and the transverse frame member 20 is formed by a clamp 96 secured to the end of the central frame member 22 opposite from the clamps 90 and a two part collar 98 secured to the rod 34. The clamp 96 is comprised of a lower pillow block 100 secured to the central frame member 22, and two upper pillow blocks 102, 104 that clamp to the lower pillow block and straddle the collar 98. As shown most clearly in FIGS. 10 and 11, the pillow blocks 100, 102, and 104 have an opening through which the rod 34 passes with ample clearance to allow limited angular movements and no restriction on linear displacement. Hence when the generally rectangular frame of the carriage 10 deviates from the rectangular shape due to a variation in gauge dimension of the railroad track, or due to a rise or fall of a railhead, the pillow blocks of the clamp 96 accommodate the limited movement of the central frame member 22 without resistance.

The two-part collar 98 is clamped in a fixed position onto the rod 34 to limit the linear movements of the central frame member 22. The limits of linear movement are defined by a cavity in which the collar is mounted within the pillow blocks. As shown most clearly in FIGS. 9 and 11 the width of the collar is less than the width of the cavity. The clearance between the collar and the pillow blocks allows the collar and the rod 34 of the transverse frame member 20 shift linearly within the cavity with respect to the pillow blocks and central frame member until the collar makes contact with one or the other limits of the cavity. Therefore, when the carriage frame deviates from its generally rectangular configuration while tracking rail deviations, the central frame member 22 will allow deviation of the frame until the collar 98 reaches one or the other limits of the cavity, and at that limit further deviation of the configuration is restrained.

Although the restraint of the carriage frame configuration has been provided by the central frame member connected to the front and rear transverse members, the restraint can be provided by connections between any two of the frame members.

While the present disclosure has been illustrated and described with respect to particular embodiments thereof, it should be appreciated by those of ordinary skill in the art that various modifications to this disclosure may be made without departing from the spirit and scope of the present disclosure.

What is claimed is:

1. An adaptive inspection carriage for inspecting the rails of a railroad by means of one or more detectors supported by the carriage comprising:
   a frame having a generally rectangular configuration with oppositely disposed first and second side members and first and second transverse members, each of the side members in an operative position extending generally parallel to a respective rail to be inspected, each of the transverse members in an operative position extending in a direction generally transverse to the rails,
   the first transverse member connected at one end with the first side member by means of a swivel coupling having one swivel axis generally perpendicular to the plane of the generally rectangular frame and another swivel axis generally parallel to the first side member, and connected at the other end to the second side member by means of a swivel coupling having one swivel axis generally perpendicular to the plane of the generally rectangular frame and no swivel axis parallel to the second side member; and
   the second transverse member connected at one end with the second side member by means of a swivel coupling having one swivel axis generally perpendicular to the plane of the generally rectangular frame and another swivel axis generally parallel to the second side member, and connected at the other end to the first side member by means of a swivel coupling having one swivel axis generally perpendicular to the plane of the generally rectangular frame and no swivel axis parallel to the first side member.

2. An adaptive inspection carriage for inspecting rails as defined in claim 1 wherein
   the first transverse member is comprised by a bushing at one end coupled to the first side member by means of the swivel coupling having two swivel axes, and another bushing at the opposite end coupled to the second side member by the swivel coupling having one swivel axis generally perpendicular to the plane of the rectangular frame and no swivel axis parallel to the second side member; and
   the second transverse member is comprised by a bushing at one end coupled to the second side member by means of the coupling have two swivel axes, and another bushing at the opposite end coupled to the first side member by the coupling having one swivel axis generally perpendicular to the plane of the rectangular frame and no swivel axis parallel to the second side member.

3. An adaptive inspection carriage for inspecting rails as defined in claim 2 wherein carriage wheels supporting the carriage in its operative position on the rails are mounted to each of the bushings.

4. An adaptive inspection carriage for inspecting rails as defined in claim 1 wherein each of the first and second transverse members is an adjustable gauging member having an adjustable length between the swivel couplings with the side members, each gauging member including an actuator for adjusting the length of the member according variations in the gauge separation of the rails.

5. An adaptive inspection carriage for inspecting rails as defined in claim 4 wherein
   each of the first and second transverse members is comprised of a bushing connected to the first side member by one of the swivel couplings, and a bushing connected to the second side member by another of the swivel couplings; and
   the actuator for the transverse member is connected to the bushings of the transverse member.

6. An adaptive inspection carriage for inspecting rails as defined in claim 5 wherein carriage wheels are mounted to each of the bushings for supporting the carriage on the railroad rails.

7. An adaptive inspection carriage for inspecting rails as defined in claim 6 wherein the carriage wheels mounted on the bushings are without flanges, and gauge-face follower wheels are connected to each of the bushings in the vicinity of the carriage wheels.

8. An adaptive inspection carriage for inspecting rails as defined in claim 6 wherein a pair of gauge-face follower wheels is connected to the bushings fore and aft in the travel direction of each carriage wheel.

9. An adaptive inspection carriage for inspecting rails as defined in claim 8 wherein each gauge-face follower wheel is mounted to a bushing at an angle to the axis of rotation of the carriage wheel.

10. An adaptive inspection carriage for inspecting rails as defined in claim 9 wherein the angle at which the gauge-face follower wheels are mounted is in the range of 30° to 50° to the axis of rotation of the carriage wheel.

11. An adaptive inspection carriage for inspecting the rails of a railroad as defined in claim 1 further including a configuration restraint connected to any two of the frame members and limiting the degree of deviation of the frame members from a rectangular configuration.

12. An adaptive inspection carriage as defined in claim 11 wherein the configuration restraint comprises a T-bar having a fixed connection with one of the frame members and a floating connection with the opposite frame member, the floating connection providing limited movement of the opposite frame member relative to the one frame member.

13. An adaptive inspection carriage as defined in claim 12 wherein the T-bar also serves as a lifting bar for raising and lowering the carriage onto the rails to be inspected.

14. An inspection carriage for travel along the rails of a railroad with one or more inspection devices inspecting the rails comprising:
   a carriage frame having two side members that extend generally parallel to the rails during an inspection procedure, and two transverse members extending transverse to the rails and connected with the side members in a rectangular configuration;
   swivel couplings joining the transverse members with the side members at the corners of the rectangular configuration;

two of the swivel couplings joining the members at diagonal corners of the rectangular configuration providing two pivot axes between the joined members, one pivot axis being perpendicular to the plane of the rectangular configuration, and the other pivot axis being parallel to the side member connected with the swivel coupling; and two of the swivel couplings joining the members at the other diagonal corners of the rectangular configuration providing one pivot axis perpendicular to the plane of the rectangular configuration between the joined members, and providing no pivot axis parallel to the side member connected with the swivel coupling.

15. An inspection carriage for travel along the rails of a railroad as defined in claim 14 wherein the transverse members have adjustable lengths to accommodate variations in the gauge of the rails.

16. An inspection carriage for travel along the rails of a railroad as defined in claim 15 wherein carriage wheels supporting the inspection carriage for travel along the rails are connected to the carriage frame at the corners of the rectangular configuration.

17. An inspection carriage for travel along the rails of a railroad as defined in claim 14 wherein each transverse member is elongated with bushings at each end, and the bushings connect the transverse members with the side members by means of the swivel couplings.

18. An inspection carriage for travel along the rails of a railroad as defined in claim 17 wherein each elongated transverse member is adjustable in length between the ends, and includes an actuator to adjust the length of the member.

19. An inspection carriage as defined in claim 18 wherein:
a carriage wheel without a flange and rotatable about a generally horizontal axis in an operative position supporting the inspection carriage for travel along the rails is connected to each of the bushings; and
a pair of gauge-face follower wheels is mounted to each of the bushings with the wheels of the pair being located fore and aft of the carriage wheel in the travel direction.

20. An inspection carriage as defined in claim 19 wherein the pair of gauge face follower wheels are mounted with axes of rotation at an angle to the axes of the carriage wheels.

21. An inspection carriage as defined in claim 19 wherein a check rail plow is mounted between a pair of gauge face follower wheels.

22. An inspection carriage for moving inspection instruments along the rails of a railroad comprising:
carriage wheels mounted to the carriage for rotation about horizontal axes of rotation to support of the carriage for rolling movement along the rails in an inspection operation; and
a pair of gauge-face follower wheels mounted fore and aft of at least one of the carriage wheels in the travel direction, the gauge-face follower wheels being mounted with the axes of rotation of the follower wheels at an angular relationship with the horizontal axis of rotation of the carriage wheel.

23. An inspection carriage for moving inspection instruments as defined in claim 22 wherein the angular relationship lies in the range of 30° to 50°.

24. An inspection carriage for moving inspection instruments as defined in claim 22 further including a check rail plow interposed between the pair of gauge-face follower wheels.

25. An inspection carriage for moving inspection instruments over the rails of a railroad comprising:
a carriage frame for supporting one or more inspection tools that inspect the rails, the frame having a transverse frame component extending between lateral sides of the frame, and being adjustable in length to accommodate variations in the gauge dimension of the rails, the transverse frame component having an actuator adjusting the length of the transverse frame component to accommodate the gauge dimension of the rails;
a first carriage wheel connected with the adjustable transverse frame component at the one lateral side of the frame for rotation about a horizontal axis, and supporting the carriage for rolling movement along the rails of the railroad;
a first pair of gauge face follower wheels connected with the adjustable transverse frame component for rotation about axes of rotation disposed at an angle to the horizontal axis of the first carriage wheel and positioned fore and aft of the first carriage wheel;
a second carriage wheel connected with the adjustable transverse frame component at the lateral side of the frame opposite the one lateral side of the frame for rotation about a horizontal axis, and supporting the carriage for rolling movement along the rails of the railroad;
a second pair of gauge face follower wheels connected with the transverse frame component for rotation about axes of rotation disposed at an angle to the horizontal axis of the second carriage wheel and positioned fore and aft of the second carriage wheel; and
a first check-rail plow connected with the transverse frame component and positioned adjacent the second carriage wheel and between the second pair of gauge-face follower wheels at the opposite lateral side of the frame.

26. An inspection carriage for moving inspection instruments as defined in claim 25 further including a second check-rail plow connected with the transverse frame component and positioned adjacent the first carriage wheel between the first pair of gauge-face follower wheels at the one lateral side of the frame.

27. An inspection carriage for moving inspection instruments as defined in claim 25 wherein the first carriage wheel is a flangeless wheel; and a fixed length connection joins the first carriage wheel and the first check-rail plow.

* * * * *